(12) United States Patent
D'Amico

(10) Patent No.: US 6,978,805 B2
(45) Date of Patent: Dec. 27, 2005

(54) HIGH PRESSURE FLEXIBLE HOSE

(75) Inventor: James J. D'Amico, Kirkland Hills, OH (US)

(73) Assignee: Dyna-Flex, Inc., Mentor, OH (US)

( * ) Notice: Subject to any disclaimer, the term of this patent is extended or adjusted under 35 U.S.C. 154(b) by 0 days.

(21) Appl. No.: 10/909,936

(22) Filed: Aug. 2, 2004

(65) Prior Publication Data
US 2005/0051226 A1    Mar. 10, 2005

Related U.S. Application Data

(60) Provisional application No. 60/493,705, filed on Aug. 8, 2003.

(51) Int. Cl.$^7$ ............................................. F16L 11/04
(52) U.S. Cl. ...................... 138/125; 138/127; 138/172; 138/133
(58) Field of Search ............................... 138/123–127, 138/130, 172, 174, 133, 138, 143

(56) References Cited

U.S. PATENT DOCUMENTS

| | | | | |
|---|---|---|---|---|
| 1,736,106 A | * | 11/1929 | Williamson, Jr. ............ | 138/127 |
| 3,669,157 A | * | 6/1972 | Woodall et al. ......... | 139/387 R |
| 3,812,885 A | * | 5/1974 | Sajben et al. ............... | 138/125 |
| 3,828,112 A | * | 8/1974 | Johansen et al. ............. | 174/47 |
| 4,190,088 A | * | 2/1980 | Lalikos et al. .............. | 138/126 |
| 4,273,160 A | * | 6/1981 | Lowles ....................... | 138/124 |
| 4,585,035 A | * | 4/1986 | Piccoli ........................ | 138/127 |
| 4,699,178 A | * | 10/1987 | Washkewicz et al. ........ | 138/125 |
| 4,777,859 A | * | 10/1988 | Plummer, Jr. ..................... | 87/7 |
| 6,109,306 A | * | 8/2000 | Kleinert ...................... | 138/127 |
| 6,390,141 B1 | * | 5/2002 | Fisher et al. ................. | 138/137 |
| 6,742,545 B2 | * | 6/2004 | Fisher et al. ................. | 138/137 |

* cited by examiner

*Primary Examiner*—Patrick Brinson
(74) *Attorney, Agent, or Firm*—Fitch, Even, Tabin & Flannery

(57) ABSTRACT

A flexible, thermoplastic hose for high pressure and high velocity flow is provided with a flexible braided reinforcement layer with a static drain therein for conducting static electricity towards a ground. This is achieved by having at least one textile fiber yarn with conductive fibers therein braided with non-conducting textile yarns to form the braided reinforcement layer. The preferred conducting fiber yarn is formed with metal fibers as well as plastic fibers. A method of manufacture of the hose comprises providing electrical conducting yarns and non-conducting yarns in a braiding machine and braiding them about a tube having a hollow bore through which fluid flows. An abrasion resistant outer cover layer of polyurethane is extruded over the braided layer having the drain therein. For higher pressure applications, a second braided reinforcement layer may also be provided over the inner braided layer having the electrically conductive yarns. Several conductive yarns may be used to have spaced electrically conductive yarns, e.g., at 3:00, 6:00, 9:00 and 12:00 in a circular cross-section through the hose.

8 Claims, 1 Drawing Sheet

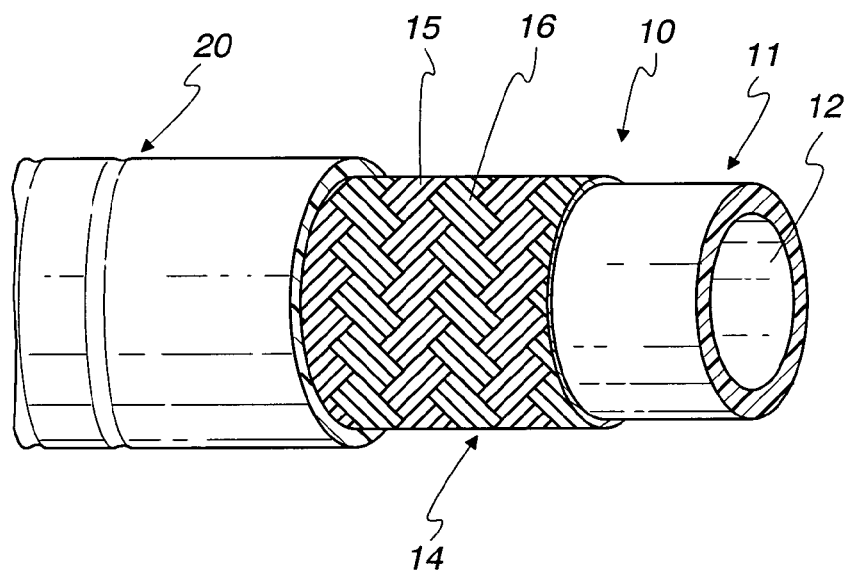

HIGH PRESSURE FLEXIBLE HOSE

CROSS-REFERENCE TO RELATED APPLICATION

This application claims the benefit of U.S. Provisional Patent Application No. 60/493,705, filed Aug. 8, 2003.

FIELD OF THE INVENTION

This invention relates to a flexible, high pressure, thermoplastic hose having a static electricity drain and used for various applications such as conveying paints, fuels, oils and solvents.

BACKGROUND OF THE INVENTION

These flexible thermoplastic hoses typically have internal bore diameters from ⅛ to ⅝ inch and a length of up to 500 feet. The working pressures in these hoses may be as high, e.g., 1,000 to 10,000 psi working pressures, and the hoses are desired to be light in weight, durable, flexible, abrasion resistant, and have a static discharge.

The high velocity flow of fluids through the hose may create static electricity that could result in static sparking, which may cause fire or explosion, if the hose and equipment are not properly grounded. These hoses are provided with static electricity drains leading to a ground and periodically the electrical resistance of the hose is checked. For example, the end-to-end resistance of the unpressurized hose must not exceed a maximum of 29 megohm and typically the length of hose is limited to 500 feet or less in length. If hose exceeds the 29 megohm resistance, it is to be replaced.

One conventional hose of this kind has a seamless, inner tube or core of nylon and has a carbon conductivity layer encircling the inner tube to act as a static electricity drain. Encircling the carbon conductivity layer is a high tensile synthetic woven fiber layer or tube. An abrasion resistant outer layer is extruded over the woven fiber layer to complete the hose.

Another conventional hose of this kind is formed with an inner core or tube having an internal bore and a first and a second braided yarn filament layer with an electrically conductive tape disposed between the braided layers to conduct static electricity generated by the liquid flowing through the bore in the inner tube or core of the hose. The conductive tape results in a bump or enlargement in the circular cross-section of the hose which provides difficulty when crimping the hose to a metal fitting at an end to conduct the static electricity to ground. For example, the bump may be 0.012 in size.

Another conventional hose of this kind extrudes an electrically conductive tube between the first and second braided layers to conduct static electricity. Typically, the formation of two concentric braided layers involves what is termed a double decking of braiding machines which usually must be attended by a person. In contrast thereto, a single deck or one braiding machine can be usually run unattended without any person in attendance.

There is a need for a new and improved hose of this kind that provides a simple and less expensive static drain than using a metal tape between yarn layers or a conductive, extruded tube between the braided layers.

Also, there is a need for a lighter weight hose of this kind, and a need for a hose of this kind which may be made with an improved method of manufacture.

SUMMARY OF THE INVENTION

In accordance with an embodiment, a flexible, thermoplastic hose for high pressure and high velocity fluid flow is provided with a flexible braided layer having a static electric drain therein. This is achieved, preferably, by having at least one textile yarn with electrically conductive fibers therein and braiding the conductive yarn with non-conductive textile yarns to form a high tensile strength layer which also provides a static electricity drain for the hose. The use of the electrically conductive yarn allows a more uniform diameter for the hose than prior art hoses having an electrically conductive tape between layers that results in a bump or enlargement in diameter at the location of the tape. The use of electrically conductive and non-conductive yarns in the braided layer results in a simpler, lighter weight and less expensive hose construction than the prior art construction that has an electrically conductive tube sandwiched between braided layers to conduct static electricity.

The preferred electrically conductive yarn is an electrically conductive textile yarn which has conductive metal fibers and non-electrical conductive fibers. The other non-electrically conductive yarns used for braiding are preferably made of polyester and/or Aramid fiber yarn. These several electrically conductive textile yarns are braided in a braiding machine with non-conductive textile yarns to provide the high tensile strength reinforcement for the hose. In a circular cross-section cut through the hose and the braided layer, the electrically conductive yarns may appear at 3:00, 6:00, 9:00 and 12:00 positions or more often, as deemed necessary to make the static drain around the diameters which may vary.

Typically, the hose will have one or more braided layers to resist the high internal working pressures of up to 10,000 psi and have outer extruded layer of abrasion resistant plastic such as abrasion resistant polyurethane serving as a cover to protect the braided layer or layers. A preferred use of these hoses is for airless, wireless paint hoses.

BRIEF DESCRIPTION OF THE DRAWINGS

FIG. 1 is a perspective view of a hose having the layers thereof exposed for illustration and having a braided static drain.

DETAILED DESCRIPTION OF THE PREFERRED EMBODIMENT

As shown in the drawings for purposes of illustration, a flexible thermoplastic hose 10 is provided an inner tube 11 having a hollow interior bore 12 through which the high velocity and high velocity fluid, such as paint, will flow. The preferred tube 11 is seamless, thermoplastic tube which is typically made of nylon or is nylon lined.

A high tensile strength reinforcement for the inner tube 11 is provided by one or more braided layers 14 which are formed of braided textile yarns 15 and 16. An outer cover or tube 20 made of abrasion resistant plastic such as polyurethane covers the braided layer to provide flexibility while allowing tight bends of the hose.

In accordance with the preferred embodiment, the braided reinforcement layer 14 is formed with one or more electrically conducting textile yarns 15 which are woven with non-electrically conducting yarns 16 to provide a static drain within the braided reinforcement layer.

The preferred electrically conducting textile yarn 15 contains a percentage of metal fibers such as stainless steel fibers and is sold under the trademark BeKITEX, BK 50/2 by BeKintex N.A., 1395 South Marietta Parkway, Marietta, Ga. 30067. This textile yarn contains 20% metal fibers and 80% non-metal fibers. The present invention is not limited to this particular conductive textile yarn as such may be obtained from other manufacturers and they may have a different percentage of metal fibers therein than the 20% metal fibers of stainless steel and 80% plastic fibers that are present in the BeKitex, BK 50/2 textile yarn.

In the illustrated embodiment for lower pressure applications, only a single braided reinforcement layer 16 is present in the hose 10 with the electrical drain provided in electrically conductive yarns used in the braiding machine. A second braided layer, not shown, may also be employed for greater tensile strength, if so desired for higher pressure applications. The second layer may be only of non-conductive, plastic textile yarns or it may also contain electrically conductive yarns therein to drain static electricity.

Usually, several electrically conductive yarns 15 are placed on the braiding machine with non-conducting yarns 16 also being placed on the braiding machine. The braiding machine braids the fibers to form the reinforcement layer 14 which automatically has the conductive yarns therein for draining static electricity to ground. A right circular cut through the hose may show the conductive yarn 15 being at 3:00, 6:00, 9:00 and 12:00 positions with the non-conductive yarns 16 being between these conductive yarns 15. Usually, the yarns are made of polyester.

A single unattended (or single deck) braiding machine is preferred because a double deck braiding machine for braiding two reinforcement layers must be attended by a person which adds to final cost for the product. Also, no conductive tape or tube need be extruded and placed in the hose which also adds to the cost of the final product.

These flexible layers 10 are usually limited to 500 feet in length. For airless, wireless hoses used for paint flow, the electrical resistance is limited to 29 megohm. These hoses typically have interior bores 12 in the range of ⅛ to ⅝ inch in internal diameter. Some of the hoses are rated at 1,000 to 10,000 psi working pressure, while others are rated at 4,000 to 20,000 psi minimum bursting pressure. The maximum operating pressures are usually in the 1,000 to 5,000 psi range. The hoses are flexible in that they have a minimum bending radius in the range of 1.75 to 5 inches.

For lower fluid pressures, only a single braided layer is used while two braided layers are used for high fluid pressures. The conductive yarns 15 are preferably braided in the layer 14 next to the internal tube 11. The conductive yarns can be braided into both the reinforcement layers 14 where two braided layers are used. Alternatively, more electrically conductive yarns can be braided into a more dense pattern of braid for static electricity draining to ground.

What is claimed is:

1. A flexible, thermoplastic hose for high pressure and high velocity fluid flow comprising:
    a flexible inner core tube of plastic material having a hollow internal bore;
    a flexible outer abrasion resistant jacket of plastic; and
    a flexible braided, reinforcement layer formed of braided yarn to provide tensile strength for the hose and having a static drain therein for static electricity, the braided reinforcement layer comprising electrically conductive yarns comprised of metal and non-metal fibers interleaved with electrically non-conductive yarns to form the braided reinforcement layer.

2. A flexible, thermoplastic hose for high pressure and high velocity fluid flow comprising:
    a flexible inner core tube of plastic material having a hollow internal bore;
    a flexible outer abrasion resistant jacket of plastic; and
    a flexible braided, reinforcement layer formed of braided yarn to provide tensile strength for the hole and having a static drain therein for static electricity, the braided reinforcement layer comprising electrically conductive yarns interleaved with electrically non-conductive yarns; and
    wherein the braided reinforcement layer is formed of textile yarns some of which have metal fibers therein to provide the static electricity drain.

3. A hose in accordance with claim 2 comprising:
    non-electrically conductive yarns of polyester or Aramid fiber are braided with the electrically conductive textile yarns.

4. An airless, wireless paint spray hose for high pressure paint flow comprising:
    a flexible inner core tube of plastic material having a hollow internal bore;
    a flexible outer abrasion resistant jacket of plastic;
    a flexible braided layer formed of braided filaments, the braided reinforcement layer comprising at least one electrically conductive filaments interleaved with electrically non-conductive filaments to form the braided layer; and
    the at least one electrically conductive filaments being comprised of plastic and metal yarn to provide for static electrical conduction.

5. A hose in accordance with claim 4 wherein the hose has an interior bore in the range of ⅛ to ⅝ inch diameter.

6. An airless, wireless paint spray hose for high pressure paint flow comprising:
    a flexible inner core tube of plastic material having a hollow internal bore;
    a flexible outer abrasion resistant jacket of plastic;
    a flexible braided layer formed of braided filaments, the braided reinforcement layer comprising conductive yarns interleaved with non-conductive yarn;
    at least one of the braided filaments being comprised of plastic and metal yarn to provide for static electrical conduction; and
    wherein the hose has a length of up to 500 feet; and
    the metal yarn having fibers of stainless steel therein mixed with plastic fibers to form the metal yarn.

7. An airless, wireless paint spray hose for high pressure paint flow comprising:
    a flexible inner core tube of plastic material having a hollow internal bore;
    a flexible outer abrasion resistant jacket of plastic;
    a flexible braided layer formed of braided filaments, the braided reinforcement layer comprising conductive yarns interleaved with non-conductive yarn;
    at least one of the braided filaments being comprised of plastic and metal yarn to provide for static electrical conduction; and
    the hose does not exceed 29 megohm of electrical resistance.

8. A hose in accordance with claim 7 wherein the hose withstands bursting pressures of up to 20,000 psi.

* * * * *

UNITED STATES PATENT AND TRADEMARK OFFICE
CERTIFICATE OF CORRECTION

PATENT NO. : 6,978,805 B2 Page 1 of 1
DATED : December 27, 2005
INVENTOR(S) : James J. D'Amico It is certified that error appears in the above-identified patent and that said Letters Patent is hereby corrected as shown below:

<u>Column 4,</u>
Line 7, change "hole" to -- hose --.

Signed and Sealed this

Thirteenth Day of June, 2006

JON W. DUDAS
*Director of the United States Patent and Trademark Office*